(12) United States Patent
Kwon et al.

(10) Patent No.: US 10,747,646 B1
(45) Date of Patent: Aug. 18, 2020

(54) EXTENSIBLE DEVICE DRIVER VERIFICATION

(71) Applicant: Microsoft Technology Licensing, LLC, Redmond, WA (US)

(72) Inventors: Hyuk Joon Kwon, Redmond, WA (US); Jakob Frederik Lichtenberg, Redmond, WA (US); Vladimir A. Levin, Redmond, WA (US); Andrew Meyer Kluemke, Seattle, WA (US); Sebastian Lerner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/275,844

(22) Filed: Feb. 14, 2019

(51) Int. Cl.
| | |
|---|---|
| *G06F 9/44* | (2018.01) |
| *G06F 11/36* | (2006.01) |
| *G06F 11/30* | (2006.01) |
| *G06F 11/34* | (2006.01) |

(52) U.S. Cl.
CPC .......... *G06F 11/364* (2013.01); *G06F 11/302* (2013.01); *G06F 11/3471* (2013.01)

(58) Field of Classification Search
CPC .................................................... G06F 11/364
See application file for complete search history.

(56) References Cited

U.S. PATENT DOCUMENTS

| | | | | |
|---|---|---|---|---|
| 5,210,876 A | * | 5/1993 | Uchida | ...................... G06F 8/41 717/139 |
| 9,851,956 B2 | | 12/2017 | O'Rourke et al. | |
| 2004/0237071 A1 | * | 11/2004 | Hollander | ........... G06F 12/1441 717/124 |
| 2007/0094673 A1 | | 4/2007 | Hunt et al. | |
| 2007/0209032 A1 | * | 9/2007 | Mihai | ............ G01R 31/318371 717/126 |

(Continued)

OTHER PUBLICATIONS

Ball, et al., "The Static Driver Verifier Research Platform", In Proceedings of International Conference on Computer Aided Verification, Jul. 15, 2010, 04 Pages.

(Continued)

*Primary Examiner* — Hang Pan
(74) *Attorney, Agent, or Firm* — Holzer Patel Drennan

(57) ABSTRACT

Interaction between operating system components and device drivers via device driver function call addresses is monitored. Each device driver is configured to interface with at least one hardware component of a computing system. One or more verification functions of an extended device driver verification component are registered for at least one of the device driver function call addresses, each defining a predetermined verification condition. A device driver function call to one of the device driver function call addresses is intercepted and evaluated against the predetermined verification condition of the verification function registered for the device driver function call address of the intercepted device driver function. A result of executing the intercepted device driver function, responsive to satisfaction of the predetermined verification condition or terminated, responsive failure to satisfy the predetermined verification condition of the verification function registered for the device driver function call address of the intercepted device driver function.

20 Claims, 9 Drawing Sheets

(56) References Cited

U.S. PATENT DOCUMENTS

2012/0084759 A1   4/2012  Candea et al.
2014/0372985 A1*  12/2014  Levin .................. G06F 11/3608
                                                            717/126

OTHER PUBLICATIONS

Shershakov, et al., "An SDVRP Platform Verification Method for Microprocessor-Based Systems Software", In Proceedings of Spring/Summer Young Researchers' Colloquium on Software Engineering, Issue 6, Jan. 1, 2012, 6 Pages.

Xue, et al., "A Software-based Approach to Testing VMware® vSphere® VMkernel Public APIs", In VMware Technical Journal, Jan. 1, 2012, 16 Pages.

* cited by examiner

EXTENSIBLE DEVICE DRIVER VERIFICATION

BACKGROUND

A device driver is a computer program that controls or operates one or more hardware components in a computing system. The device driver provides a software interface between the hardware components and an operating system and/or applications and utilities. Device drivers and the operating system components may interact via function calls, such as application programming interfaces (APIs) function calls that are published and updated over time by the operating system vendor, the hardware vendor, or standards groups; and function callbacks by an operating system component to function addresses provided by the device driver.

Many device drivers are written by software developers of assorted hardware vendors to work in a variety of operating system environments, although other software developers may also write device drivers. Device driver developers may inadvertently or maliciously introduce improper operations into the device drivers, which may result in computer crashes, performance issues, and/or security breaches. These improper operations typically surface when functions are called improperly (e.g., with the wrong parameters, in the wrong sequence). Verifying proper device driver operation is a challenging yet important responsibility of modern computing systems.

SUMMARY

The described technology addresses such limitations by monitoring interaction between operating system components and device drivers via device driver function call addresses. Each device driver is configured to interface with at least one hardware component of a computing system. One or more verification functions of an extended device driver verification component are registered for at least one of the device driver function call addresses, each defining a predetermined verification condition. A device driver function call to one of the device driver function call addresses is intercepted and evaluated against the predetermined verification condition of the verification function registered for the device driver function call address of the intercepted device driver function. A result of executing the intercepted device driver function, responsive to satisfaction of the predetermined verification condition or terminated, responsive failure to satisfy the predetermined verification condition of the verification function registered for the device driver function call address of the intercepted device driver function.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

In a computing system, a device driver verifier can monitor interaction between one or more device drivers and operating system components to detect illegal function calls or other improper actions that might corrupt the computing system. As such, a device driver verifier can be useful throughout device driver development and system debugging.

Figure 1:
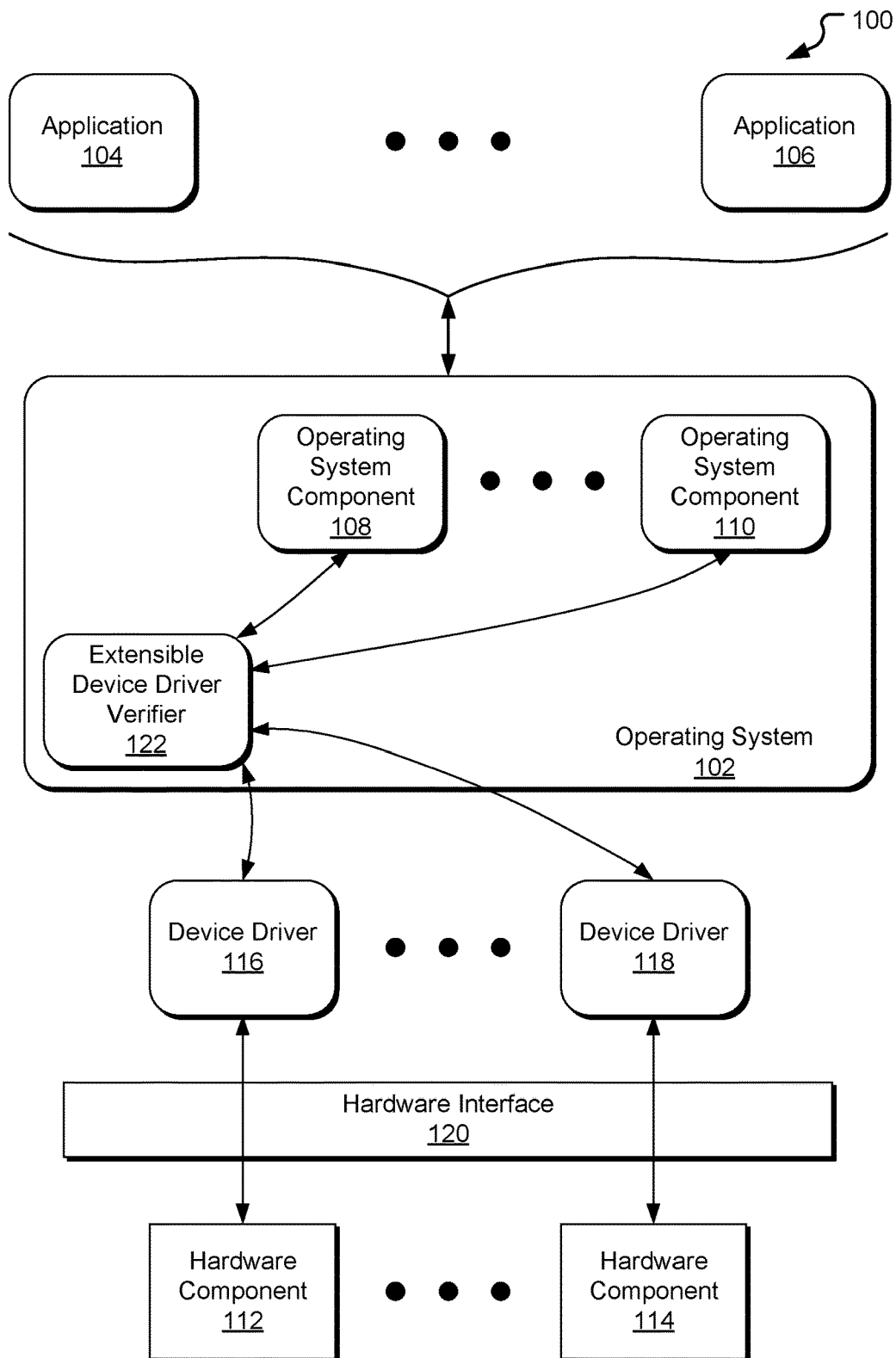
FIG. 1 illustrates an example computing environment providing extended device driver verification.

FIG. 1 illustrates an example computing environment 100 providing extended device driver verification. An operating system 102 manages hardware and software resources in the example computing environment 100. Applications 104 and 106 interact with various operating system components 108 and 110. In addition, the operating system 102 interacts with hardware components 112 and 114 via device drivers 116 and 118, respectively. The device drivers 116 and 118 communicate with the hardware components 112 and 114 via a hardware interface 120, such as an internal or external data bus. For example, if the application 104 is a collaboration application and the hardware component 114 is a network controller, the application 104 may communicate with versions of a document stored in the Cloud through the operating system 102, the device driver 118, the hardware interface 120, and the hardware component 114 in both directions.

The device drivers 116 and 118 and the operating system 102 interact via function calls. Generally, the device drivers 116 and 118 call the operating system 102 through published API function calls, and the operating system 102 calls the device driver 116 and 118 via function callbacks, which are typically registered with the operating system 102 by each device driver. Such functions calls are referred to as "device driver function call" herein, including both API function calls, operating system calls, and function callbacks.

In one implementation, an extended device driver verification component may be referred to as a plugin to an extensible device driver verifier, as the extended device driver verification component can be added to the extensible device driver verifier independently of other components (including other plugins) through registration, which does not require any code change in the extensible device driver verifier itself. This "pluggable" feature can be supported with a generic interface between the extensible device driver verifier and its registered extended device driver verification components. For example, in one implementation, the registered extended device driver verification components are presented in a dynamic data structure, such as a set of linked lists, with a separate linked list for each intercepted API function (originally) called from a device driver and a separate linked list for each intercepted driver callback (originally) called from an operating system component. Thus, upon registering a new extended device driver verification component, on-entry and/or on-exit verification function addresses of the extended device driver verification component are dynamically added to the linked lists associated with those API function and callback functions that this extended device driver verification component registers for and verifies.

As shown in FIG. 1, the operating system 102 includes an extensible device driver verifier 122, which verifies the device driver function calls between the operating system 102 (e.g., specifically, in this example, the various operating system components 108 and 110) and the device drivers 116 and 118. The extensible device driver verifier 122 includes a driver interception interface (not shown in FIG. 1) that intercepts these device driver function calls and directs them to extended device driver verification components (not shown in FIG. 1) to verify each function call for proper operation. Rather than allowing the device driver function calls to execute directly between the various operating system components 108 and 110 and the device drivers 116 and 118, the extended device driver verification components intercept and evaluate each function call against a predetermined verification condition. In one implementation, the predetermined verification condition may be defined by a set of one or more predetermined verification rules, including without limitation:

1. Irql checking rule for the API call KeRaiseIrql: The KeRaiseIrql routine raises the hardware priority to the specified IRQL value, thereby masking off interrupts of equivalent or lower IRQL on the current processor. The KeRaiseIrql routine receives input parameters of NewIrql and OldIrql and requires that the NewIrql must be greater or equal to the OldIrql. Accordingly, when a device driver calls the KeRaiseIrql function, a verification routine of an extended device driver component verifies that the condition is satisfied (i.e., NewIrql>=OldIrql).
2. Security check rule for operating system calls: Device driver routines that run in a process context other than that of the system process must set the OBJ_KERNEL_HANDLE flag in the HandleAttributes parameter. This requirement restricts the use of the handle returned by ObOpenObjectByPointer function to processes running in kernel mode. Accordingly, internal operating system functions call a verifier function to verify that OBJ_KERNEL_HANDLE flag is set for such device driver routines.
3. Memory corruption check rule: A device driver should not free memory that does not belong to that device driver. Accordingly, when a device driver calls the API function ExAllocatePool, a verification routine of an extended device driver component examines the pool address that the device driver is asking to free and verifies that the pool address was allocated or otherwise belongs to that device driver.

Such evaluation can be performed by more than one extended device driver verification component and may be performed "on-entry" to or "on-exit" from the device driver function (e.g., an API function call or a function callback). For "on-entry" verification, the device driver function call is evaluated for verification before the device driver function is actually called. For "on-exit" verification, the device driver function call is evaluated for verification after the device driver function has been called and returns from execution. If the device driver function call is verified by the extensible device driver verifier 122 and the intercepting extended device driver verification components, then the extensible device driver verifier 122 directs the processing (a) to the target function's original address (e.g., in the operating system components or the device drivers) on-entry or (b) to the return address of the device driver function call (e.g., in the operating system components or the device drivers) on-exit. If the device driver function call fails verification by the extensible device driver verifier 122 and the intercepting extended device driver verification components, then the extensible device driver verifier 122 returns to the calling function (e.g., in the operating system components or the device drivers) with a device driver verification error.

Figure 2:
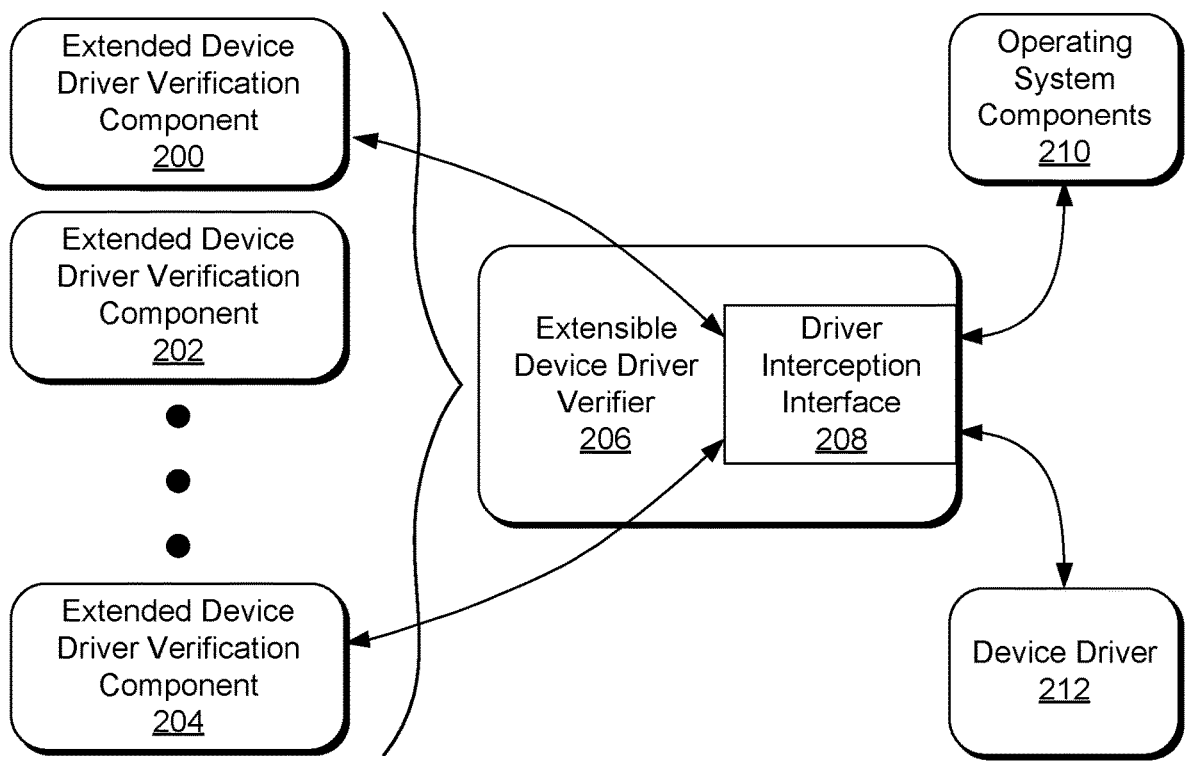
FIG. 2 illustrates example extended device driver verification components registered with an extensible device driver verifier.

FIG. 2 illustrates example extended device driver verification components 200, 202, and 204 registered with an extensible device driver verifier 206. The extended device driver verification components 200, 202, and 204 evaluate function calls between operating system components 210 and device drivers 212, whether on-entry to or entry from the function.

Each extended device driver verification component is typically developed and maintained by a party responsible for the operating system component with which a device driver may interact. For example, a development group responsible for the network stack in an operating system may develop the extended device driver verification component for device drivers within the network stack. Alternatively, other developers may develop their own extended device driver verification components for use with various drivers, operating system aspects (e.g., security, privacy, performance), hardware components, and operating systems. An example extended device driver verification component is capable of registering with the extensible device driver verifier 206 and validating device driver function calls in one or both directions between device drivers and operating system components on-entry and/or on-exit based on a predetermined verification condition enforced by the extended device driver verification component. An advantage of the relative independence of the extended device driver verification component from the extensible device driver verifier and the corresponding registration is that either can be updated independently of the other.

Accordingly, when the extensible device driver verifier 206 is initiated, the extended device driver verification components 200, 202, and 204 register with a driver interception interface 208 of the extensible device driver verifier 206. In one example registration process, the extended device driver verification component 202 calls a registration interface of the driver interception interface 208 of the extensible device driver verifier 206, providing an address of a registration function of the extended device driver verification component 202. The driver interception interface 208 then calls the registration function of the extended device driver verification component 202, which registers one or more verification function addresses (e.g., "on-entry" and/or "on-exit) to verification functions in the extended device driver verification component 202. Each verification function corresponds to at least one device driver function call address (e.g., an API function call address or a driver function callback address) and evaluates the function call for verification, whether on-entry to or on-exit from the function.

In one implementation of registration, the driver interception interface 208 modifies the original target function call and/or return addresses in the device drivers and the operating system components to call interception functions in the driver interception interface 208, rather than the original target function call itself. The driver interception interface 208 thereby intercepts the original target function call by virtue of these replaced device driver function call addresses.

In one implementation, there are at least two types of interception modes:

(a) "On-entry"—When a device driver function (e.g., an API function or function callback) is called by a device driver or an operating system component, processing is directed to intercepting functions of the driver interception interface 208 by virtue of the replaced function addresses before the original target function call is executed. The intercepting functions in the driver interception interface 208 then direct processing to one or more verification function addresses of the extended device driver verification components that have registered to verify the original target function call by the device driver or the operating system component. If the device driver function call is verified by the registered extended device driver verification components, then the driver interception interface 208 directs the processing to the target function's original address (e.g., in the operating system components or the device drivers). If the device driver function call fails verification by the extended device driver verification components that have registered to verify the original target function call, then the driver interception interface 208 returns to the calling function (e.g., in the operating system components or the device drivers) with a device driver verification error.

(b) "On-exit"—After the original target function call is executed (e.g., as an API function or function callback) by a device driver or an operating system component, processing is directed to intercepting functions of the driver interception interface 208 by virtue of the replaced return addresses. The intercepting functions in the driver interception interface 208 then direct processing to one or more verification function addresses of the extended device driver verification components that have registered to verify the original target function call by the device driver or the operating system component. If the device driver function call is verified by the registered extended device driver verification components, then the driver interception interface 208 directs the processing to the target function's original return address (e.g., in the operating system components or the device drivers). If the device driver function call fails verification by the extended device driver verification components that have registered to verify the original target function call, then the driver interception interface 208 returns to the calling function (e.g., in the operating system components or the device drivers) with a device driver verification error.

On both entry and exit, the extensible device driver verifier 206 can direct the function call to the originally called device driver function address for evaluation by the extended device driver verification component(s) according to a predetermined verification condition. It should be understood that depending on how an extended device driver verification component registers with the driver interception interface 208, either or both of entry or exit verification may be evaluated.

If the extensible device driver verifier 206 detects a violation of one or more of the predetermined verification conditions, the device driver function can terminate the process (e.g., aborts the driver execution, crashes the computer) and/or log verification error information (e.g., parameter values from execution, saving off some or all of kernel memory, saving off error codes). In cases where the extensible device driver verifier 206 initiates a computer crash, example device driver verification errors may include without limitation:

Bug Check 0xC1: SPECIAL_POOL_DETECTED_MEMORY_CORRUPTION

Bug Check 0xC4: DRIVER_VERIFIER_DETECTED_VIOLATION

Bug Check 0xC6: DRIVER_CAUGHT_MODIFYING_FREED_POOL

Bug Check 0xC9: DRIVER_VERIFIER_IOMANAGER_VIOLATION

Bug Check 0xD6: DRIVER_PAGE_FAULT_BEYOND_END_OF_ALLOCATION

Bug Check 0xE6: DRIVER_VERIFIER_DMA_VIOLATION

Multiple verification functions from one or more extended device driver verification components may be registered for the same device driver function address. In such cases, the verification functions may be called sequentially with the associated device driver function call is intercepted. Likewise, if no verification functions are registered for a particular device driver function address, then the associated device driver function call need not be intercepted at all, thereby avoiding the performance impact of intercepting function calls.

Figure 3:
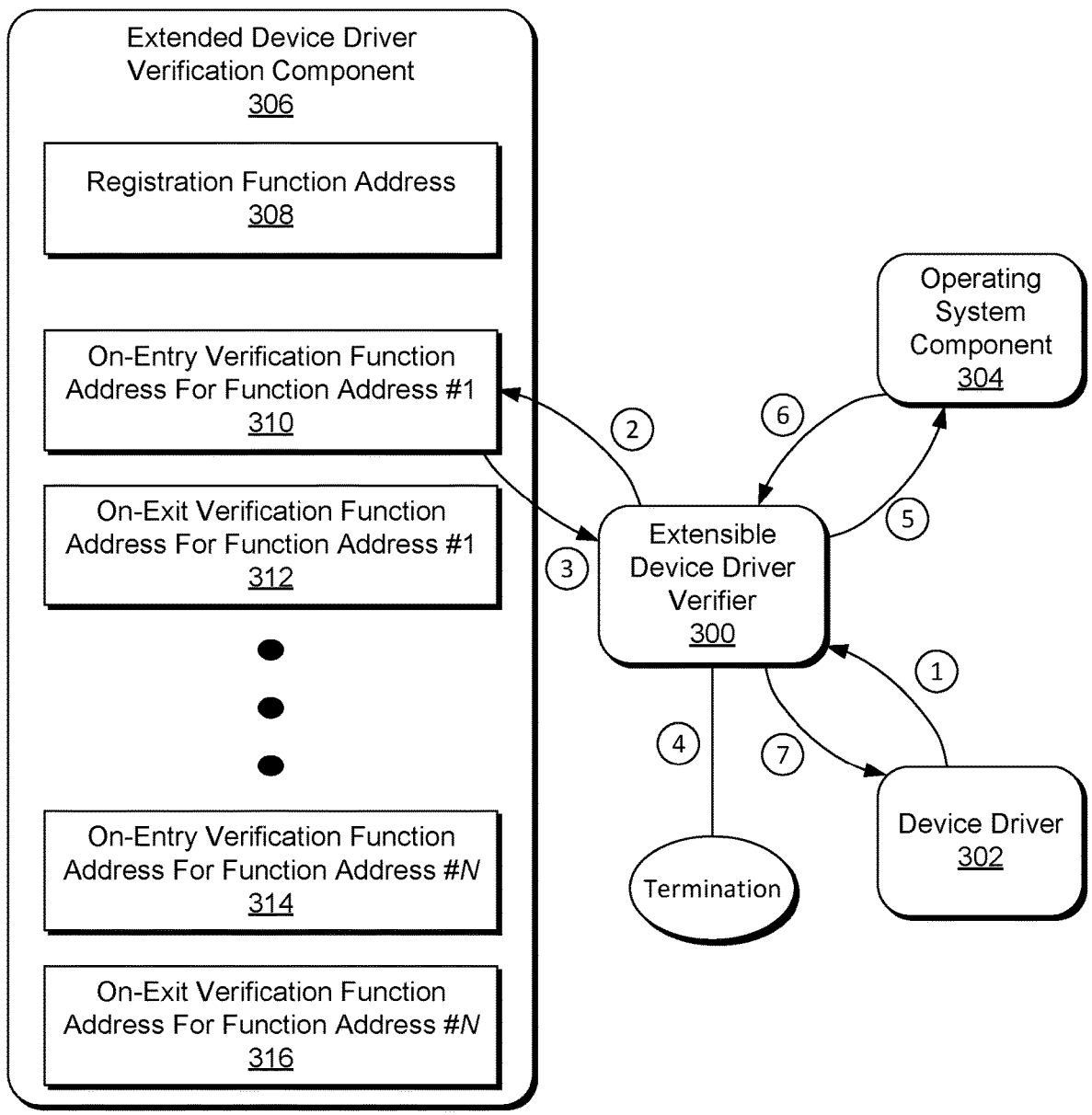
FIG. 3 illustrates an example extensible device driver verifier intercepting a device driver API call to an operating system component "on-entry" to the operating system component.

FIG. 3 illustrates an example extensible device driver verifier 300 intercepting a device driver 302 API call to an operating system component 304 "on-entry" to the operating system component 304. An extended device driver verification component 306 is registered with a driver interception interface of the example extensible device driver verifier 300, such as by submitting to the driver interception interface an address 308 for a registration function for the extended device driver verification component 306. During registration, the driver interception interface calls the registration function of the extended device driver verification component 306, which returns addresses for select entry and/or exit verification function calls in the extended device driver verification component 306 (see, e.g., the on-entry verification function address for function address #1 310, the on-exit verification function address for function address #1 312, the on-entry verification function address for function address #N 314, and the on-exit verification function address for function address #N 316).

In FIG. 3, the function address #1 corresponds to an API function in the operating system component 304, so an API call to the function address #1 by a device driver 302 "on-entry" to the operating system component 304 is illustrated in a sequence of seven operations in an example implementation (the conditional operation sequence is illustrated by the numerals in the circles in FIG. 3):

1) The device driver 302 makes the API call (e.g., to the function address #1) to the operating system component 304. Because the registration of the extended device driver verification component 306 allowed the driver interception interface of the example extensible device driver verifier 300 to intercept the API call (e.g., by replacing the API function address known by the device driver 302 with an interception function address in the driver interception interface in the example extensible device driver verifier 300), the API call is directed to the driver interception interface of the example extensible device driver verifier 300 instead of being directed to the operating system component 304 directly.

2) The driver interception interface of the example extensible device driver verifier 300 calls each on-entry verification function address registered for the function address #1, the verification functions at which evaluate the API call.

3) The on-entry verification function for function address #1 evaluates the API call to determine whether the API call satisfies the predetermined verification condition, returning a function call verification result.

4) If the device driver function call fails verification by the by the on-entry verification function address registered for the function address #1, then the driver interception interface of the example extensible device driver verifier 300 terminates the device driver function call and issues a device driver verification error.

5) If the device driver function call is verified by the on-entry verification function address registered for the function address #1, then the driver interception interface of the example extensible device driver verifier 300 directs the processing to the address of the original API call address of the operating system component 304.

6) The API call result is returned by the operating system component 304 to the example extensible device driver verifier 300.

7) The API call result is returned by the example extensible device driver verifier 300 to the device driver 302.

Figure 4:
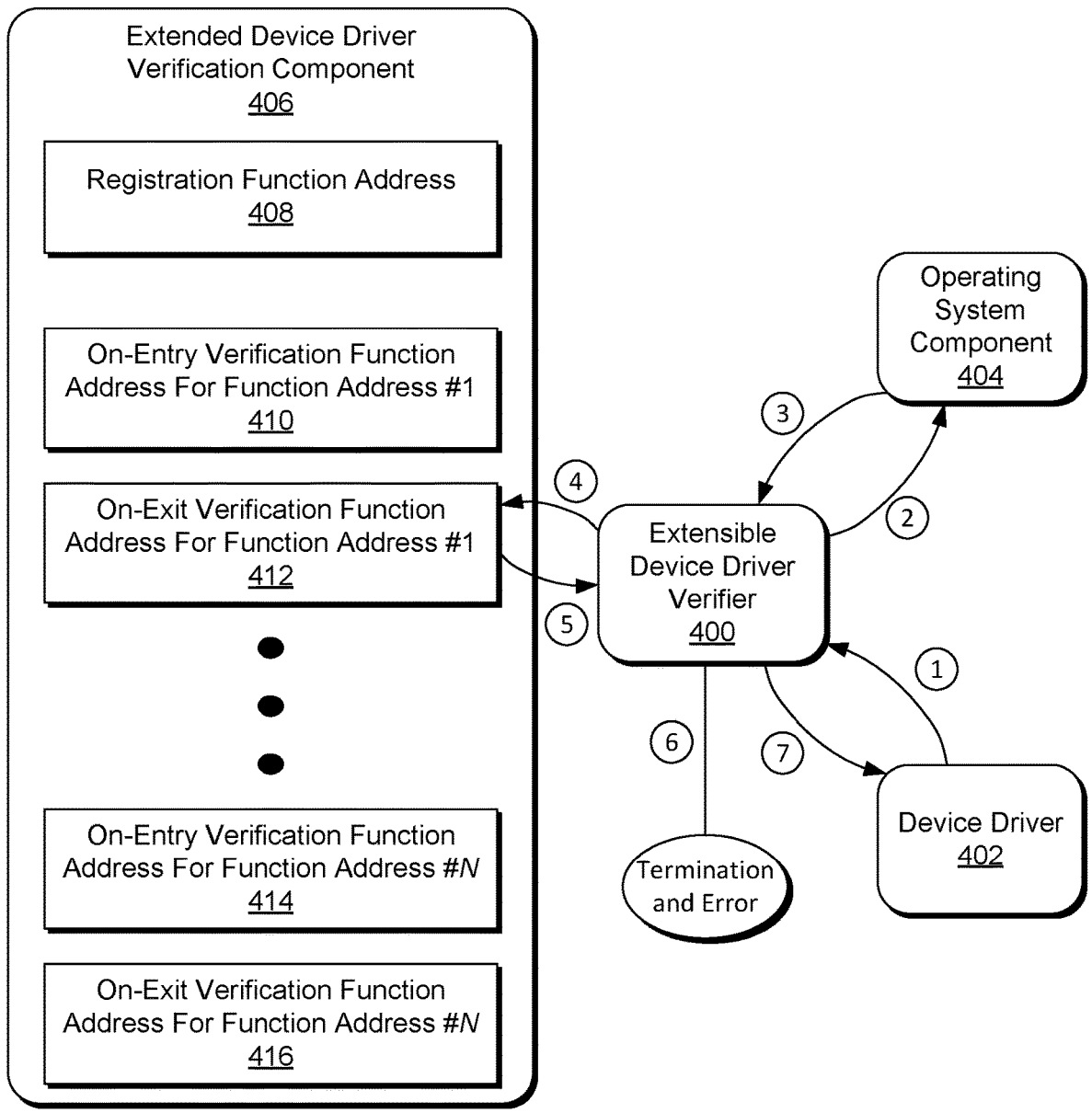
FIG. 4 illustrates an example extensible device driver verifier intercepting a device driver API call to an operating system component "on-exit" from the operating system component.

FIG. 4 illustrates an example extensible device driver verifier 400 intercepting a device driver 402 API call to an operating system component 404 "on-exit" from the operating system component 404. An extended device driver verification component 406 is registered with a driver interception interface of the example extensible device driver verifier 400, such as by submitting to the driver interception interface an address 408 for a registration function for the extended device driver verification component 406. During registration, the driver interception interface calls the registration function of the extended device driver verification component 406, which returns addresses for select entry and/or exit verification function calls in the extended device driver verification component 406 (see, e.g., the on-entry verification function address for function address #1 410, the on-exit verification function address for function address #1 412, the on-entry verification function address for function address #N 414, and the on-exit verification function address for function address #N 416).

In FIG. 4, the function address #1 corresponds to an API function in the operating system component 404, so an API call to the function address #1 by a device driver 402 "on-exit" from the operating system component 404 is illustrated in a sequence of seven operations in an example implementation (the conditional operation sequence is illustrated by the numerals in the circles in FIG. 4):

1) The device driver 402 makes the API call (e.g., to the function address #1) to the operating system component 404. Because the registration of the extended device driver verification component 406 allowed the driver interception interface of the example extensible device driver verifier 400 to intercept the API call (e.g., by replacing the API function address known by the device driver 402 with an interception function address in the example extensible device driver verifier 400), the API call is directed to the driver interception interface of the example extensible device driver verifier 400 instead of being directed to the operating system component 404 directly.

2) The driver interception interface of the example extensible device driver verifier 400 directs the processing to the address of the original API call address in the operating system component 404.

3) The API call result is returned by the operating system component 404 to the example extensible device driver verifier 400.

4) The driver interception interface of the example extensible device driver verifier 400 calls each on-exit verification function address registered for the function address #1, the verification functions at which evaluate the API function call to determine whether the API call satisfies the predetermined verification condition.

5) The on-exit verification function for function address #1 evaluates the API function call for verification, returning a function call verification result.

6) If the device driver function call fails verification by the on-exit verification function address registered for the function address #1, then the driver interception interface of the example extensible device driver verifier 400 terminates the device driver function call and issues a device driver verification error.

7) If the device driver function call is verified by the on-exit verification function address registered for the function address #1, then the driver interception interface of the example extensible device driver verifier 400 returns the API call result to the calling function of the device driver 402 with a verification success.

Figure 5:
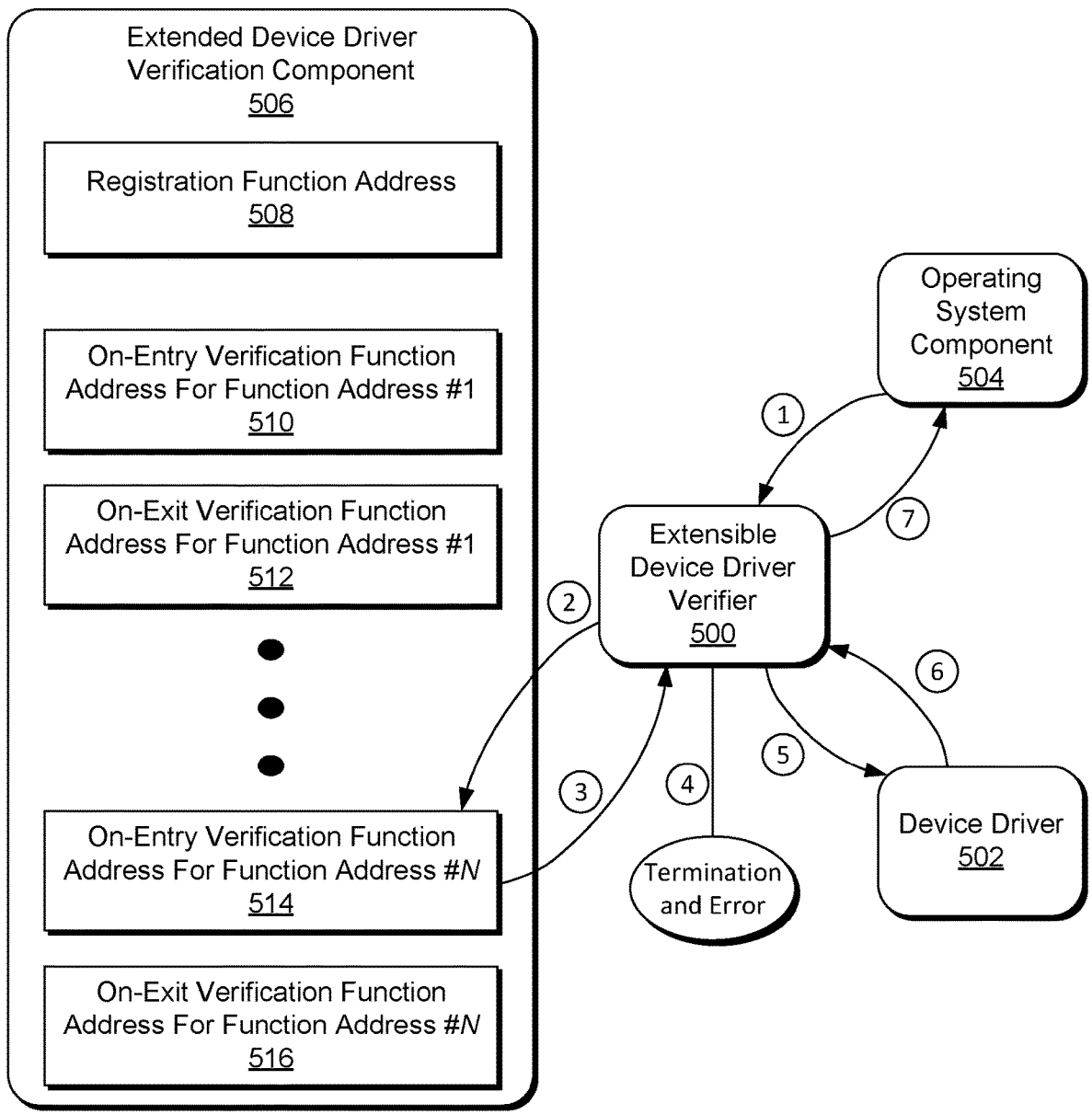
FIG. 5 illustrates an example extensible device driver verifier intercepting an operating system component function callback to a device driver "on-entry" to the device driver.

FIG. 5 illustrates an example extensible device driver verifier 500 intercepting function callback by an operating system component 504 to a device driver 502 "on-entry" to the device driver 502. An extended device driver verification component 506 is registered with a driver interception interface of the example extensible device driver verifier 500, such as by submitting to the driver interception interface an address 508 for a registration function for the extended device driver verification component 506. During registration, the driver interception interface calls the registration function of the extended device driver verification component 506, which returns addresses for select entry and/or exit verification function calls in the extended device driver verification component 506 (see, e.g., the on-entry verification function address for function address #1 510, the on-exit verification function address for function address #1 512, the on-entry verification function address for function address #N 514, and the on-exit verification function address for function address #N 516).

In FIG. 5, the function address #N corresponds to a callback function in the device driver 502, so a function callback to the function address #N by the operating system component 504 "on-entry" is illustrated in a sequence of seven operations in an example implementation (the conditional operation sequence is illustrated by the numerals in the circles in FIG. 5):

1) The operating system component 504 makes the function callback (e.g., to the function address #N) to the device driver 502. Because the registration of the extended device driver verification component 506 allowed the driver interception interface of the example extensible device driver verifier 500 to intercept the function callback (e.g., by replacing the callback function address known by the operating system component 504 with an interception function address in the example extensible device driver verifier 500), the function callback is directed to the driver interception interface of the example extensible device driver verifier 500 instead of being directed to the device driver 502 directly.

2) The driver interception interface of the example extensible device driver verifier 500 calls each on-entry verification function address registered for the function address #N, the verification functions at which evaluate the function callback to determine whether the function callback satisfies the predetermined verification condition.

3) The on-entry verification function for function address #N evaluates the function callback for verification, returning a callback verification result.

4) If the function callback fails verification by the by the on-entry verification function address registered for the function address #N, then the driver interception interface of the example extensible device driver verifier 500 terminates the device driver function call and issues a device driver verification error.

5) If the function callback is verified by the on-entry verification function address registered for the function address #N, then the driver interception interface of the example extensible device driver verifier 500 directs the processing to the address of the original callback function address of the device driver 502.

6) The function callback result is returned by the device driver 502 to the example extensible device driver verifier 500.

7) The function callback result is returned by the example extensible device driver verifier 500 to the operating system component 504.

Figure 6:
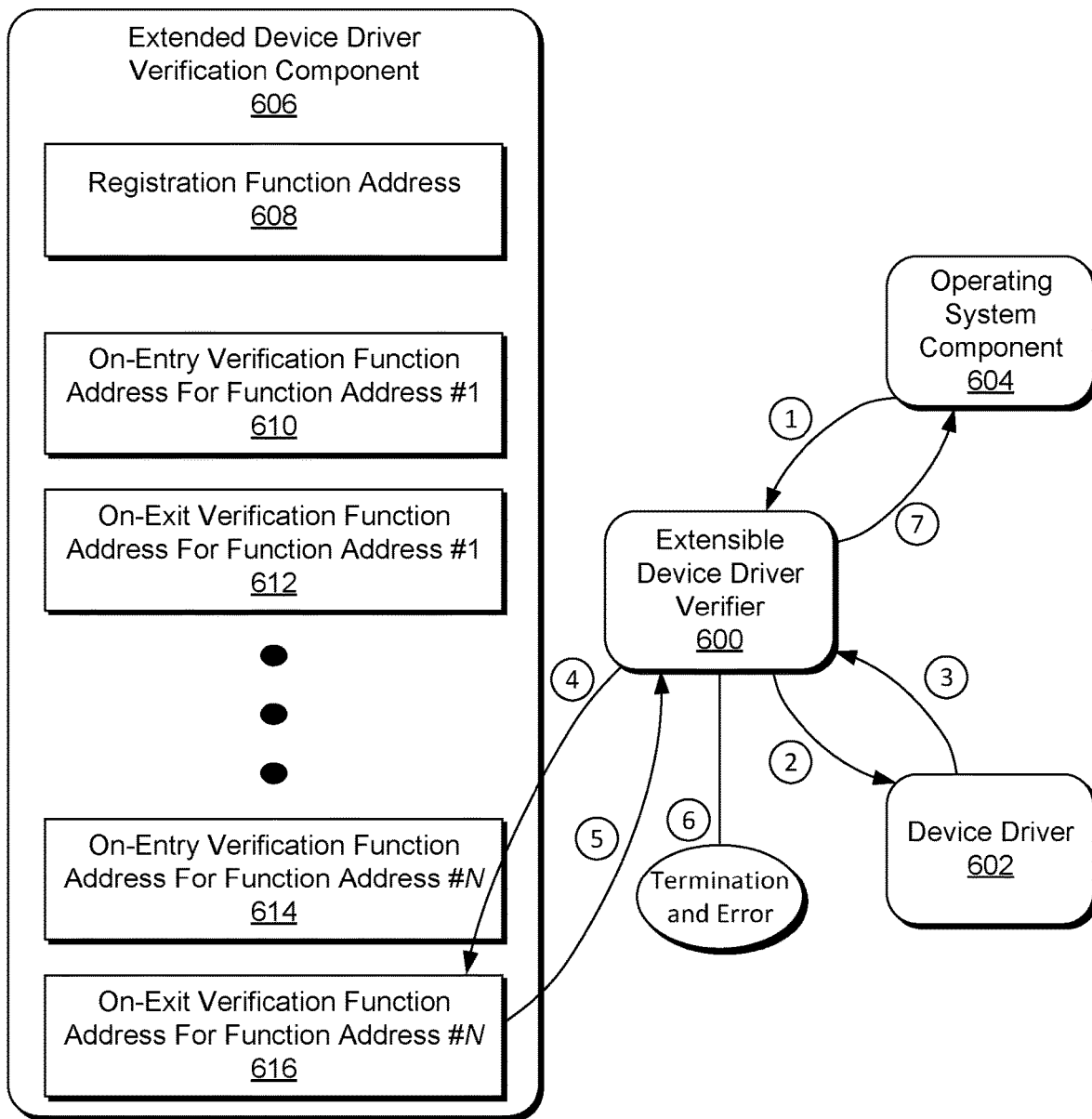
FIG. 6 illustrates an example extensible device driver verifier intercepting an operating system component function callback to a device driver "on-exit" from the device driver.

FIG. 6 illustrates an example extensible device driver verifier 600 intercepting a function callback by an operating system component 604 to a device driver 602 "on-exit" from the device driver 602. An extended device driver verification component 606 is registered with a driver interception interface of the example extensible device driver verifier 600, such as by submitting to the driver interception interface an address 608 for a registration function for the extended device driver verification component 606. During registration, the driver interception interface calls the registration function of the extended device driver verification component 606, which returns addresses for select entry and/or exit verification function calls in the extended device driver verification component 606 (see, e.g., the on-entry verification function address for function address #1 610, the on-exit verification function address for function address #1 612, the on-entry verification function address for function address #N 614, and the on-exit verification function address for function address #N 616).

In FIG. 6, the function address #N corresponds to a callback function in the device driver 602, so a function callback to the function address #N by the operating system component 604 "on-exit" is illustrated in a sequence of seven operations in an example implementation (the conditional operation sequence is illustrated by the numerals in the circles in FIG. 6):

1) The operating system component 604 makes a function callback (e.g., to the function address #N) to the device driver 602. Because the registration of the extended device driver verification component 606 allowed the driver interception interface of the example extensible device driver verifier 600 to intercept the function callback (e.g., by replacing the callback function address known by the operating system component 604 with an interception function address in the example extensible device driver verifier 600), the function callback is directed to the driver interception interface of the example extensible device driver verifier 600 instead of being directed to the device driver 602 directly.

2) The driver interception interface of the example extensible device driver verifier 600 directs the processing to the address of the original callback function address in the device driver 602.

3) The function callback result is returned by the device driver 602 to the example extensible device driver verifier 600.

4) The driver interception interface of the example extensible device driver verifier 600 calls each on-exit verification function address registered for the function address #N, the verification functions at which evaluate the function callback to determine whether the function callback satisfies the predetermined verification condition.

5) The on-exit verification function for function address #N evaluates the function callback for verification, returning a callback verification result.

6) If the function callback fails verification by the on-exit verification function address registered for the function address #N, then the driver interception interface of the example extensible device driver verifier 600 terminates the device driver function call and issues a device driver verification error.

7) If the function callback is verified by the on-exit verification function address registered for the function address #N, then the driver interception interface of the example extensible device driver verifier 600 returns the function callback result to the calling function of the operating system component 604 with a verification success.

Figure 7:
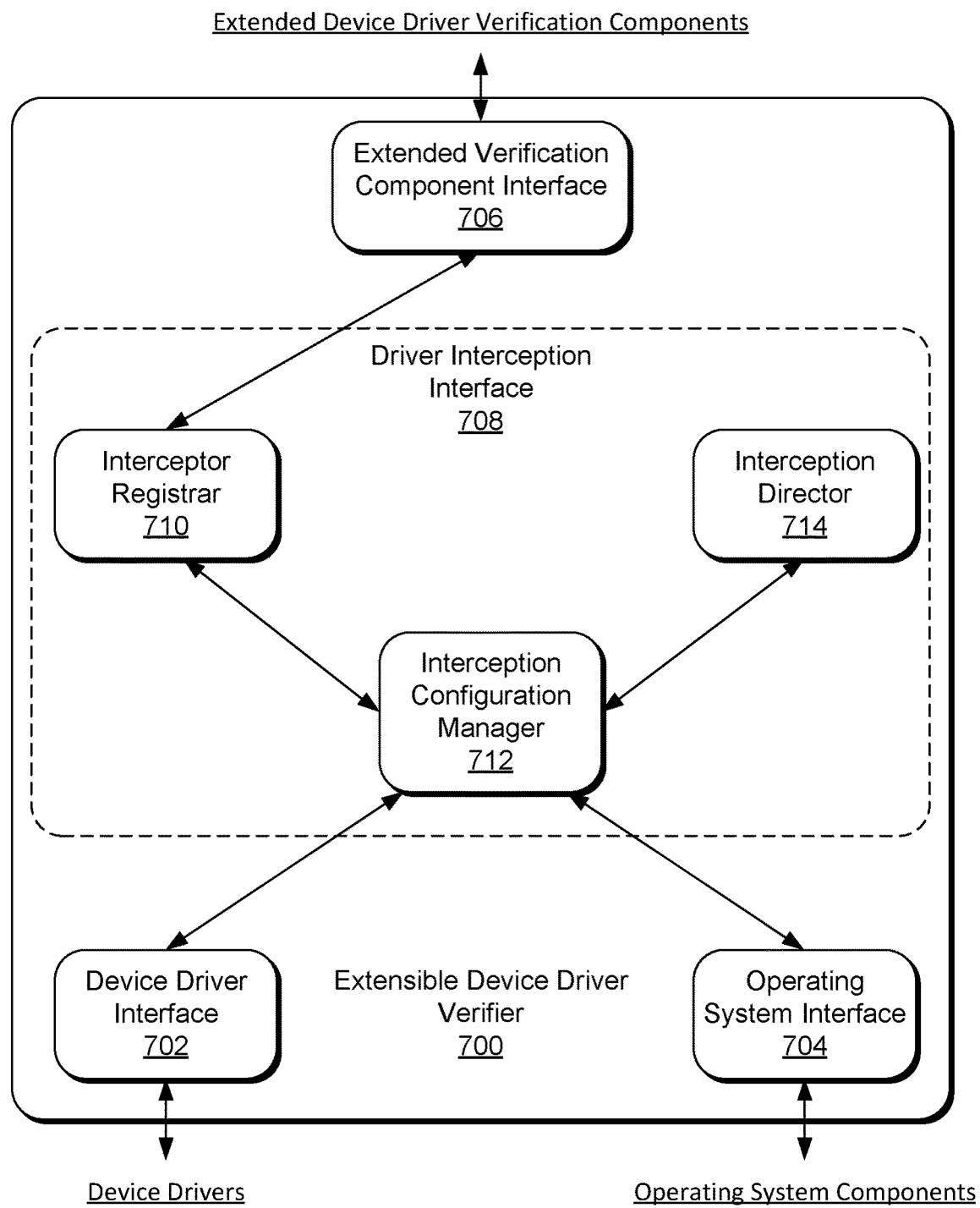
FIG. 7 illustrates an example extensible device driver verifier registering an extended device driver verification component.

FIG. 7 illustrates an example extensible device driver verifier 700 registering an extended device driver verification component. The example extensible device driver verifier 700 includes a device driver interface 702 for processing function calls and returns to/from one or more device drivers and an operating system interface 704 for processing function calls and returns to/from the operating system. The example extensible device driver verifier 700 also includes an extended verification component interface 706, which processes registration requests from extended device driver verification components and processes function calls and returns to/from the extended device driver verification components.

The example extensible device driver verifier 700 includes a driver interception interface 708 that handles registration of extended device driver verification components and interception and/or communication of function calls and returns between device drivers and operating system components. An interceptor registrar 710 receives the registration request from the extended device driver verification components and calls the registration functions provided by these components to obtain each component's verification function parameters (e.g., device driver functions of interest, on-entry verification function addresses, and on-exit verification function addresses).

An interception configuration manager 712 receives these verification function parameters and configures an interception director 714 to direct intercepted function calls appropriately. For example, the interception configuration manager 712 modifies the device driver function addresses (e.g., addresses to API function calls and function callbacks) in the device drivers and/or operating system components for every device driver function of interest to allow for interception by the interception director 714. In one implementation, the interception configuration manager 712 modifies the driver function addresses (e.g., addresses to API calls and function callbacks) in the device drivers and/or operating system components to call the interception director 714 and configures a list (in the interception director 714) of verification function addresses for each device driver function of interest. Alternatively, the interception configuration manager 712 configures a list of on-entry verification function addresses for each device driver function of interest (on entry) and a list of on-exit verification function addresses for each device driver function of interest (on exit), as appropriate.

Note: If there is no verification function registered for a particular device driver function, then calls to that device driver function need not be intercepted. In this implementation, only calls to device driver functions of interest are intercepted, which improves driver verification performance over an implementation that intercepts all device driver function calls.

Figure 8:
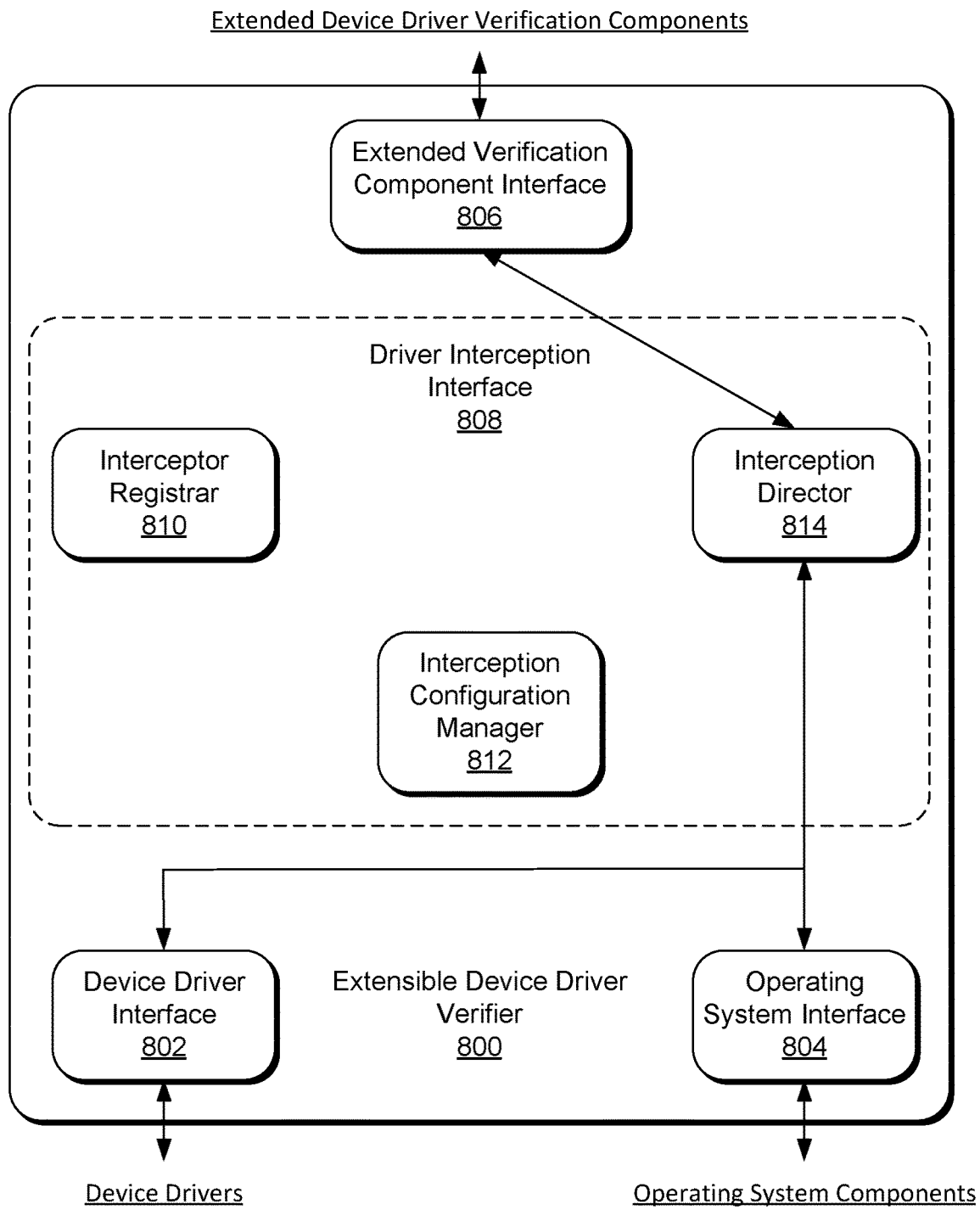
FIG. 8 illustrates an example extensible device driver verifier directing API calls through an extended device driver verification component.

FIG. 8 illustrates an example extensible device driver verifier 800 directing API calls through an extended device driver verification component. The example extensible device driver verifier 800 includes a device driver interface for processing function calls and returns to/from one or more device drivers and an operating system interface 804 for processing function calls and returns to/from the operating system. The example extensible device driver verifier 800 also includes an extended verification component interface 806, which processes registration requests from extended device driver verification components and processes function calls and returns to/from the extended device driver verification components.

The example extensible device driver verifier 800 includes a driver interception interface 808 that handles registration of extended device driver verification components and interception and/or communication of function calls and returns between device drivers and operating system components. An interceptor registrar 810 receives the registration request from the extended device driver verification components and calls the registration functions provided by these components to obtain each component's verification function parameters (e.g., device driver functions of interest, on-entry verification function addresses, and on-exit verification function addresses).

An interception configuration manager 812 receives these verification function parameters and configures an interception director 814 to direct intercepted function calls appropriately. As intercepted function calls are received by the interception director 814 through the device driver interface 802 and the operating system interface 804, whether on entry or on exit, the interception director 814 redirects the intercepted function calls through the extended verification component interface 806 to verify the functions calls with each interested extended device driver verification component.

Figure 9:
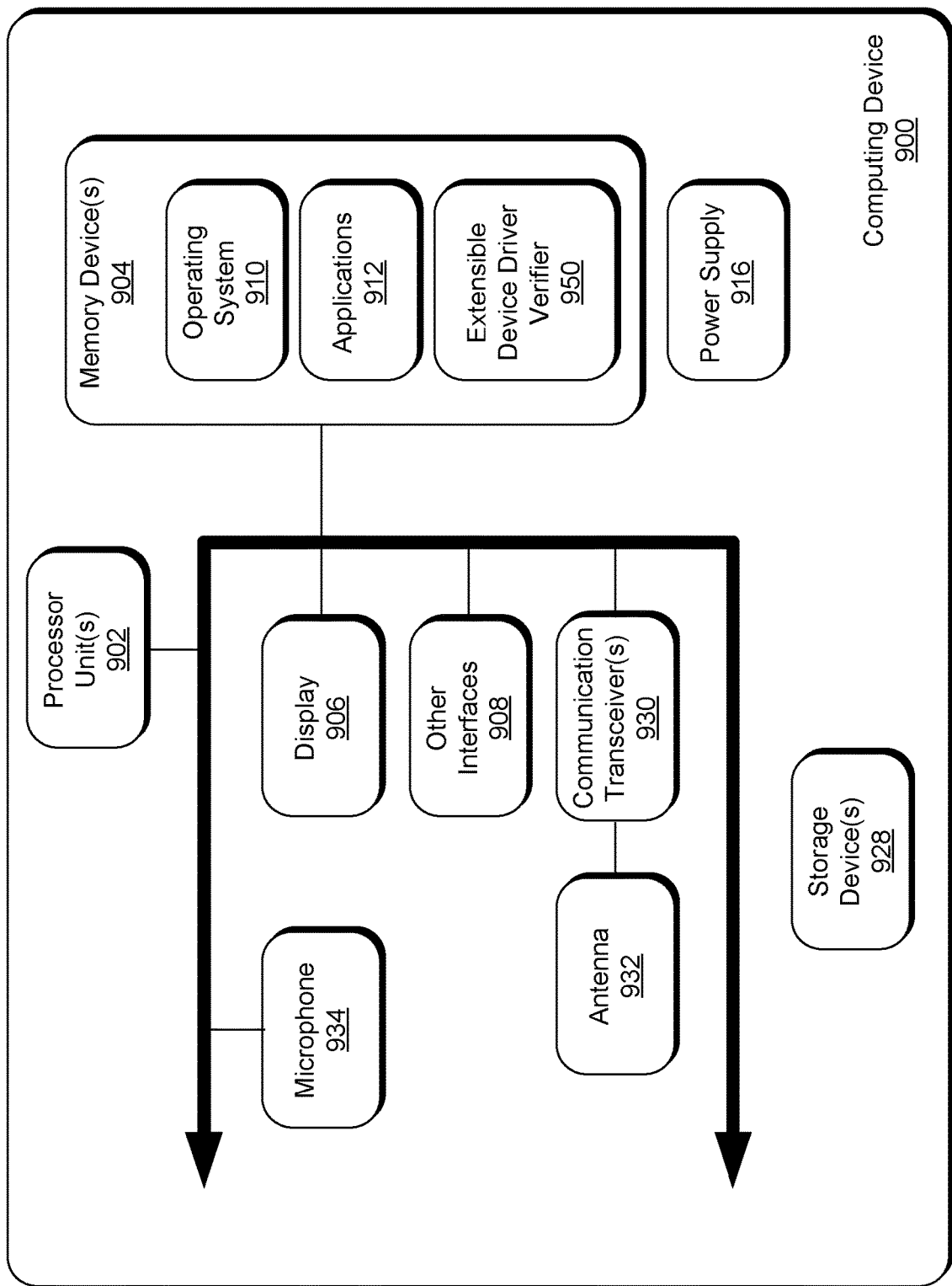
FIG. 9 illustrates an example computing device that may be useful in implementing the described technology to provide extensible device driver verification.

FIG. 9 illustrates an example computing device that may be useful in implementing the described technology to provide extensible device driver verification. The computing device 900 includes one or more processor units 902, one or more memory devices 904, a display 906 (e.g., a touchscreen display or lights), a microphone 934, and other interfaces 908 (e.g., buttons). The memory device(s) 904 generally includes either or both of volatile memory (e.g., RAM) and non-volatile memory (e.g., flash memory). An operating system 910, such as the Microsoft Windows® operating system or the Microsoft Windows® Mobile operating system, resides in the memory device(s) 904 and is executed by the processor unit(s) 902, although it should be understood that other operating systems may be employed.

One or more applications 912 may be loaded in the memory device(s) 904 and executed on the operating system 910 by the processor unit(s) 902. The computing device 900 includes a power supply 916, which is powered by one or more batteries or other power sources and which provides power to other components of the computing device 900. The power supply 916 may also be connected to an external power source that overrides or recharges the built-in batteries or other power sources.

The computing device 900 includes one or more communication transceivers 930 and an antenna 932 to provide network connectivity (e.g., a mobile phone network, Wi-Fi®, and BlueTooth®). The computing device 900 may also include various other components, such as a positioning system (e.g., a global positioning satellite transceiver), one or more accelerometers, one or more cameras, an audio interface (e.g., a microphone, an audio amplifier and speaker and/or audio jack), and one or more additional storage device(s) 928. Other configurations may also be employed.

In an example implementation, an operating system 910, various applications 912, an extensible device driver verifier 950, extended device driver verification components, and other modules and services may be embodied by instructions stored in the memory device(s) 904 and/or storage device(s) 928 and processed by the processing unit(s) 902. Verification function parameters, function addresses, and other data may be stored in memory device(s) 904 and/or storage device(s) 928 as persistent datastores.

The computing device 900 may include a variety of tangible computer-readable storage media and intangible computer-readable communication signals, or alternatively, tangible processor-readable storage media and intangible processor-readable communication signals. Tangible computer-readable storage and tangible processor-readable storage can be embodied by any available media that can be accessed by the computing device 900 and includes both volatile and nonvolatile storage media, removable and non-removable storage media. Tangible computer-readable/processor-readable storage media excludes intangible communications signals and includes volatile and nonvolatile, removable and non-removable storage media implemented in any method or technology for storage of information such as computer/processor readable instructions, data structures, program modules or other data. Tangible computer-readable/processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. In contrast to tangible computer-readable/processor-readable storage media, intangible computer-readable/processor-readable communication signals may embody computer/processor readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible computer-readable/processor-readable storage medium to store logic. Examples of such a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer/processor program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example method of monitoring interaction between operating system components and device drivers via associated device driver function call addresses is provided. Each device driver is configured to interface with at least one hardware component of a computing system. The example method includes registering one or more verification functions of an extended device driver verification component. Each verification function is registered for at least one of the associated device driver function call addresses and defining a predetermined verification condition. A device driver function call to one of the associated device driver function call addresses is intercepted. The intercepted device driver function call is evaluated against the predetermined verification condition of the verification function registered for the associated device driver function call address of the intercepted device driver function call. A result of executing the intercepted device driver function call is returned, responsive to determination that the intercepted device driver function call satisfies the predetermined verification condition of the verification function registered for the associated device driver function call address of the intercepted device driver function call.

Another example method of any preceding method includes terminating the intercepted device driver function call, responsive to determination that the intercepted device driver function call fails to satisfy the predetermined verification condition of the verification function registered for the associated device driver function call address of the intercepted device driver function call.

Another example method of any preceding method includes executing a device driver function at the associated device driver function call address after the evaluating operation, responsive to determination that the intercepted device driver function call satisfies the predetermined verification condition of the verification function registered for the associated device driver function call address of the intercepted device driver function call.

Another example method of any preceding method includes executing a device driver function at the associated device driver function call address before the evaluating operation.

Another example method of any preceding method is provided wherein the device driver function call is an application programming interface (API) function call by one of the device drivers to one of the operating system components or a device driver function callback by one of the operating system components to one of the device drivers.

Another example method of any preceding method is provided wherein the registering operation includes receiving an address to a registration function of the extended device driver verification component, calling the registration function of the extended device driver verification component, and receiving a verification function address to each of the one or more verification functions from the called registration function of the extended device driver verification component.

Another example method of any preceding method is provided wherein the registering operation includes registering one or more verification functions of another extended device driver verification component registered for the intercepted device driver function call, and the evaluating operation includes sequentially executing the verification functions of both extended device driver verification components registered for the intercepted device driver function call.

Another example method of any preceding method is provided wherein only device driver function calls having at least one verification function of one or more extended device driver verification components are intercepted by the intercepting operation.

An example system for monitoring interaction between operating system components and device drivers via associated device driver function call addresses is provided. Each device driver is configured to interface with at least one hardware component of a computing system. The example system includes a device driver interface, an operating system interface, an extended verification component interface, and an interceptor registrar coupled to the extended verification component interface and configured to register one or more verification functions of an extended device driver verification component. Each verification function is registered for at least one of the associated device driver function call addresses and defining a predetermined verification condition. The example system also includes an interception director coupled to the extended verification component interface, the device driver interface, and the operating system interface. The interception director is configured to intercept a device driver function call to one of the associated device driver function call addresses and direct the device driver function call to the verification function registered for the associated device driver function call address of the intercepted device driver function call. The verification function is configured to evaluate the intercepted device driver function call against the predetermined verification condition of the verification function and return a result of executing the intercepted device driver function call, responsive to determination that the intercepted device driver function call satisfies the predetermined verification condition of the verification function registered for the associated device driver function call address of the intercepted device driver function call.

Another example system of any preceding system is provided wherein the interception director is further configured to terminate the intercepted device driver function call, responsive to determination that the intercepted device driver function call fails to satisfy the predetermined verification condition of the verification function registered for the associated device driver function call address of the intercepted device driver function call.

Another example system of any preceding system is provided wherein the interception director is further configured to execute a device driver function at the associated device driver function call address after evaluation, responsive to determination that the intercepted device driver function call satisfies the predetermined verification condition of the verification function registered for the associated device driver function call address of the intercepted device driver function call.

Another example system of any preceding system is provided wherein the interception director is further configured to execute a device driver function at the associated device driver function call address before evaluation.

Another example system of any preceding system is provided wherein the interceptor registrar is further configured to receive an address to a registration function of the extended device driver verification component, call the registration function of the extended device driver verification component, and receive a verification function address to each of the one or more verification functions from the called registration function of the extended device driver verification component.

Another example system of any preceding system is provided wherein the interceptor registrar is further configured to register one or more verification functions of another extended device driver verification component registered for the intercepted device driver function call and the verification function registered for the associated device driver function call address of the intercepted device driver function call is further configured to sequentially execute the verification functions of both extended device driver verification components registered for the intercepted device driver function call.

One or more example tangible processor-readable storage media of a tangible article of manufacture encoding processor-executable instructions for executing on an electronic computing system a process of monitoring interaction between operating system components and device drivers via associated device driver function call addresses is provided. Each device driver is configured to interface with at least one hardware component of a computing system. The process includes registering one or more verification functions of an extended device driver verification component, each verification function being registered for at least one of the associated device driver function call addresses and defining a predetermined verification condition. The process also includes intercepting a device driver function call to one of the associated device driver function call addresses, evaluating the intercepted device driver function call against the predetermined verification condition of the verification function registered for the associated device driver function call address of the intercepted device driver function, and returning a result of executing the intercepted device driver function call, responsive to determination that the intercepted device driver function call satisfies the predetermined verification condition of the verification function registered for the associated device driver function call address of the intercepted device driver function call.

One or more other example tangible processor-readable storage media of a tangible article of manufacture of any previous article of manufacture are provided wherein the process further includes terminating the intercepted device driver function call, responsive to determination that the intercepted device driver function call fails to satisfy the predetermined verification condition of the verification function registered for the associated device driver function call address of the intercepted device driver function call.

One or more other example tangible processor-readable storage media of a tangible article of manufacture of any previous article of manufacture are provided wherein the process further includes executing a device driver function at the associated device driver function call address after the evaluating operation, responsive to determination that the intercepted device driver function call satisfies the predetermined verification condition of the verification function registered for the associated device driver function call address of the intercepted device driver function call.

One or more other example tangible processor-readable storage media of a tangible article of manufacture of any previous article of manufacture are provided wherein the process further includes executing a device driver function at the associated device driver function call address before the evaluating operation.

One or more other example tangible processor-readable storage media of a tangible article of manufacture of any previous article of manufacture are provided wherein the registering operation includes registering one or more verification functions of another extended device driver verification component registered for the intercepted device driver function call and the evaluating operation comprises sequentially executing the verification functions of both extended device driver verification components registered for the intercepted device driver function call.

One or more other example tangible processor-readable storage media of a tangible article of manufacture of any previous article of manufacture are provided wherein the registering operation includes wherein only device driver function calls having at least one verification function of one or more extended device driver verification components are intercepted by the intercepting operation.

An example system for monitoring interaction between operating system components and device drivers via associated device driver function call addresses is provided. Each device driver is configured to interface with at least one hardware component of a computing system. The example system includes means for registering one or more verification functions of an extended device driver verification component. Each verification function is registered for at least one of the associated device driver function call addresses and defining a predetermined verification condition. The example system also includes means for intercepting a device driver function call to one of the associated device driver function call addresses, means for evaluating the intercepted device driver function call against the predetermined verification condition of the verification function registered for the associated device driver function call address of the intercepted device driver function call, and means for returning a result of executing the intercepted device driver function call, responsive to determination that the intercepted device driver function call satisfies the predetermined verification condition of the verification function registered for the associated device driver function call address of the intercepted device driver function call.

Another example system of any previous system includes means for terminating the intercepted device driver function call, responsive to determination that the intercepted device driver function call fails to satisfy the predetermined verification condition of the verification function registered for the associated device driver function call address of the intercepted device driver function call.

Another example system of any previous system includes means for executing a device driver function at the associated device driver function call address after evaluation, responsive to determination that the intercepted device driver function call satisfies the predetermined verification condition of the verification function registered for the associated device driver function call address of the intercepted device driver function call.

Another example system of any previous system includes means for executing a device driver function at the associated device driver function call address before evaluation.

Another example system of any previous system is provided wherein the device driver function call is an application programming interface (API) function call by one of the device drivers to one of the operating system components or a device driver function callback by one of the operating system components to one of the device drivers.

Another example system of any previous system is provided wherein the means for registering includes means for receiving an address to a registration function of the extended device driver verification component, means for calling the registration function of the extended device driver verification component, and means for receiving a verification function address to each of the one or more verification functions from the called registration function of the extended device driver verification component.

Another example system of any previous system is provided wherein the means for registering includes means for registering one or more verification functions of another extended device driver verification component registered for the intercepted device driver function call, and the means for evaluating includes means for sequentially executing the verification functions of both extended device driver verification components registered for the intercepted device driver function call.

Another example system of any previous system is provided wherein only device driver function calls having at least one verification function of one or more extended device driver verification components are intercepted by the means for intercepting.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of monitoring interaction between operating system components and device drivers via associated device driver function call addresses, each device driver being configured to interface with at least one hardware component of a computing system, the method comprising:

executing an extensible device driver verifier in the computing system;

calling a registration function of an extended device driver verification component from the extensible device driver verifier to register one or more verification functions of the extended device driver verification component in the extensible device driver verifier, responsive to executing the extensible device drive verifier, the address of each verification function being received and registered by the extensible device driver verifier for at least one of the associated device driver function call addresses and defining a predetermined verification condition;

intercepting, by the extensible device driver verifier, a device driver function call to one of the associated device driver function call addresses, responsive to the registering;

directing execution of the intercepted device driver function call from the extensible device driver verifier to an address of a verification function registered for the associated device driver function call address of the intercepted device driver function call, responsive to the intercepting;

executing the verification function to evaluate the intercepted device driver function call against the predetermined verification condition of the verification function registered for the associated device driver function call address of the intercepted device driver function call;

receiving a result of the evaluating execution from the verification function to the extensible device driver verifier; and returning a result of executing the intercepted device driver function call, responsive to determination that the intercepted device driver function call satisfies the predetermined verification condition of the verification function registered for the associated device driver function call address of the intercepted device driver function call, responsive to receiving a result of the evaluating execution.

2. The method of claim 1 further comprising:

terminating the intercepted device driver function call, responsive to determination that the intercepted device driver function call fails to satisfy the predetermined verification condition of the verification function registered for the associated device driver function call address of the intercepted device driver function call.

3. The method of claim 1 further comprising:

executing a device driver function at the associated device driver function call address after the evaluating operation, responsive to determination that the intercepted device driver function call satisfies the predetermined verification condition of the verification function registered for the associated device driver function call address of the intercepted device driver function call.

4. The method of claim 1 further comprising:
executing a device driver function at the associated device driver function call address before the evaluating operation.

5. The method of claim 1 wherein the device driver function call is an application programming interface (API) function call by one of the device drivers to one of the operating system components or a device driver function callback by one of the operating system components to one of the device drivers.

6. The method of claim 1 wherein the registering operation comprises:
receiving an address to a registration function of the extended device driver verification component;
calling the registration function of the extended device driver verification component; and
receiving a verification function address to each of the one or more verification functions from the called registration function of the extended device driver verification component.

7. The method of claim 1 wherein the registering operation comprises registering one or more verification functions of another extended device driver verification component registered for the intercepted device driver function call, and the evaluating operation comprises sequentially executing the verification functions of both extended device driver verification components registered for the intercepted device driver function call.

8. The method of claim 1 wherein only device driver function calls having at least one verification function of one or more extended device driver verification components are intercepted by the intercepting operation.

9. A system for monitoring interaction between operating system components and device drivers via associated device driver function call addresses, each device driver being configured to interface with at least one hardware component of a computing system, the system comprising:
one or more hardware processor units configured to execute an extensible device driver verifier in the computing system;
a device driver interface;
an operating system interface;
an extended verification component interface;
an interceptor registrar executed by the one or more hardware processor units, coupled to the extended verification component interface, and configured to calling a registration function of an extended device driver verification component from the extensible device driver verifier to register one or more verification functions of the extended device driver verification component in the extensible device driver verifier, the address of each verification function being received and registered by the extensible device driver verifier for at least one of the associated device driver function call addresses and defining a predetermined verification condition; and
an interception director executed by the one or more hardware processor units and coupled to the extended verification component interface, the device driver interface, and the operating system interface, the interception director being configured to intercept a device driver function call to one of the associated device driver function call addresses and direct execution of the intercepted device driver function call from the extensible device driver verifier to an address of an verification function registered for the associated device driver function call address of the intercepted device driver function call, wherein the verification function is configured to execute the verification function to evaluate the intercepted device driver function call against the predetermined verification condition of the verification function, the interception director being further configured to receive a result of the evaluating execution from the verification function to the extensible device driver verifier and return a result of executing the intercepted device driver function call, responsive to determination that the intercepted device driver function call satisfies the predetermined verification condition of the verification function registered for the associated device driver function call address of the intercepted device driver function call, responsive to receiving a result of the evaluating execution.

10. The system of claim 9 wherein the interception director is further configured to terminate the intercepted device driver function call, responsive to determination that the intercepted device driver function call fails to satisfy the predetermined verification condition of the verification function registered for the associated device driver function call address of the intercepted device driver function call.

11. The system of claim 9 wherein the interception director is further configured to execute a device driver function at the associated device driver function call address after evaluation, responsive to determination that the intercepted device driver function call satisfies the predetermined verification condition of the verification function registered for the associated device driver function call address of the intercepted device driver function call.

12. The system of claim 9 wherein the interception director is further configured to execute a device driver function at the associated device driver function call address before evaluation.

13. The system of claim 9 wherein the interceptor registrar is further configured to receive an address to a registration function of the extended device driver verification component, call the registration function of the extended device driver verification component, and receive a verification function address to each of the one or more verification functions from the called registration function of the extended device driver verification component.

14. The system of claim 9 wherein the interceptor registrar is further configured to register one or more verification functions of another extended device driver verification component registered for the intercepted device driver function call and the verification function registered for the associated device driver function call address of the intercepted device driver function call is further configured to sequentially execute the verification functions of both extended device driver verification components registered for the intercepted device driver function call.

15. One or more tangible processor-readable storage media of a tangible article of manufacture encoding processor-executable instructions for executing on an electronic computing system a process of monitoring interaction between operating system components and device drivers via associated device driver function call addresses, each device driver being configured to interface with at least one hardware component of a computing system, the process comprising:
executing an extensible device driver verifier in the computing system;
calling a registration function of an extended device driver verification component from the extensible device driver verifier to register one or more verification functions of an extended device driver verification component in the extensible device driver verifier, responsive to executing the extensible device drive verifier, an address of each verification function being received and registered by the extensible device driver verifier for at least one of the associated device driver function call addresses and defining a predetermined verification condition;

intercepting, by the extensible device driver verifier, a device driver function call to one of the associated device driver function call addresses, responsive to the registering;

directing execution of the intercepted device driver function call from the extensible device driver verifier to an address of a verification function registered for the associated device driver function call address of the intercepted device driver function call, responsive to the intercepting;

executing the verification function to evaluate the intercepted device driver function call against the predetermined verification condition of the verification function registered for the associated device driver function call address of the intercepted device driver function;

receiving a result of the evaluating execution from the verification function to the extensible device driver verifier; and returning a result of executing the intercepted device driver function call, responsive to determination that the intercepted device driver function call satisfies the predetermined verification condition of the verification function registered for the associated device driver function call address of the intercepted device driver function call, responsive to receiving a result of the evaluating execution.

16. The one or more tangible processor-readable storage media of a tangible article of manufacture of claim 15 wherein the process further comprises:

terminating the intercepted device driver function call, responsive to determination that the intercepted device driver function call fails to satisfy the predetermined verification condition of the verification function registered for the associated device driver function call address of the intercepted device driver function call.

17. The one or more tangible processor-readable storage media of a tangible article of manufacture of claim 15 wherein the process further comprises:

executing a device driver function at the associated device driver function call address after the evaluating operation, responsive to determination that the intercepted device driver function call satisfies the predetermined verification condition of the verification function registered for the associated device driver function call address of the intercepted device driver function call.

18. The one or more tangible processor-readable storage media of a tangible article of manufacture of claim 15 wherein the process further comprises:

executing a device driver function at the associated device driver function call address before the evaluating operation.

19. The one or more tangible processor-readable storage media of a tangible article of manufacture of claim 15 wherein the registering operation comprises registering one or more verification functions of another extended device driver verification component registered for the intercepted device driver function call and the evaluating operation comprises sequentially executing the verification functions of both extended device driver verification components registered for the intercepted device driver function call.

20. The one or more tangible processor-readable storage media of a tangible article of manufacture of claim 15 wherein only device driver function calls having at least one verification function of one or more extended device driver verification components are intercepted by the intercepting operation.

* * * * *